United States Patent
Reddy et al.

(10) Patent No.: US 12,231,278 B2
(45) Date of Patent: Feb. 18, 2025

(54) SYSTEM AND METHOD FOR SPECTRALLY EFFICIENT PILOT AND DETECTOR DESIGN IN DELAY-DOPPLER DOMAIN FOR OTFS-BASED NR (NEW RADIO) IoT AND MASSIVE MACHINE TOMACHINE (M2M) COMMUNICATIONS

(71) Applicant: THE INDIAN INSTITUTE OF TECHNOLOGY KHARAGPUR, West Bengal (IN)

(72) Inventors: Chattla Santosh Reddy, West Bengal (IN); Preety Priya, West Bengal (IN); Debarati Sen, West Bengal (IN); Chetna Singhal, West Bengal (IN)

(73) Assignee: THE INDIAN INSTITUTE OF TECHNOLOGY KHARAGPUR, West Bengal (IN)

( * ) Notice: Subject to any disclaimer, the term of this patent is extended or adjusted under 35 U.S.C. 154(b) by 0 days.

(21) Appl. No.: 18/152,607

(22) Filed: Jan. 10, 2023

(65) Prior Publication Data
US 2023/0370316 A1     Nov. 16, 2023

(30) Foreign Application Priority Data
May 11, 2022   (IN) .............. 202231027219

(51) Int. Cl.
*H04L 27/26*     (2006.01)
*H04L 25/02*     (2006.01)

(52) U.S. Cl.
CPC ...... *H04L 27/2639* (2013.01); *H04L 25/0224* (2013.01)

(58) Field of Classification Search
CPC ...... H04B 7/0413; H04B 7/0456; H04B 7/10; H04B 7/0452; H04B 7/005; H04B 7/06; H04B 7/0617; H04B 1/69; H04B 1/692; H04L 27/2639; H04L 5/0023; H04L 27/2697; H04L 5/0007; H04W 24/02; H04W 72/044; H04W 4/80; H04W 72/121; H04W 72/20; H04W 88/02; H04W 72/04; H04W 72/0453
(Continued)

(56) References Cited

U.S. PATENT DOCUMENTS

| 2022/0303163 A1* | 9/2022 | Ait Aoudia ............ G06N 20/00 |
| 2023/0188404 A1* | 6/2023 | Patchava ............. H04L 27/2697 370/329 |

(Continued)

*Primary Examiner* — Eva Y Puente
(74) *Attorney, Agent, or Firm* — MASUVALLEY & PARTNERS (57) ABSTRACT

A spectrally efficient low complex Orthogonal Time Frequency Space (OTFS) modulation-based transceiver system and method is provided. The system and method are developed for uplink and downlink wireless communication for resource-constrained IoT and M2M devices. The transceiver system includes at least one transmitter configured to transmit bit stream using adaptive Orthogonal Time Frequency Space (OTFS) frame with selectively embedded pilot depending on mobility condition for improving spectral efficiency and at least one receiver configured to dispose onto IoT devices for receiving the transmitted bit stream. The receiver updates the transmitter about mobility condition of said at least one receiver through a control channel.

13 Claims, 10 Drawing Sheets

(58) Field of Classification Search
USPC ............................................. 375/260
See application file for complete search history.

(56) References Cited

U.S. PATENT DOCUMENTS

| 2023/0344582 | A1* | 6/2023 | Yuan | ..................... H04L 5/0048 |
| 2023/0254793 | A1* | 8/2023 | Patchava | ............. H04L 27/2639 |
| | | | | 370/350 |
| 2023/0388910 | A1* | 11/2023 | Yuan | ..................... H04L 5/0005 |
| 2023/0412444 | A1* | 12/2023 | Hadani | ............... H04L 27/2697 |

* cited by examiner

SYSTEM AND METHOD FOR SPECTRALLY EFFICIENT PILOT AND DETECTOR DESIGN IN DELAY-DOPPLER DOMAIN FOR OTFS-BASED NR (NEW RADIO) IoT AND MASSIVE MACHINE TO MACHINE (M2M) COMMUNICATIONS

CROSS-REFERENCE TO RELATED APPLICATION

This application claims priority to Indian Patent Application No. 202231027219 filed on May 11, 2022, which is hereby incorporated herein by reference in its entirety.

FIELD OF THE INVENTION

The present invention relates to a communication system and method. More specifically, the present invention is directed to provide a transceiver system and a cooperative communication method partly based on the insight that the OTFS modulations are only used for the higher information symbol grid in a Delay-Doppler domain. The present transceiver system and the cooperative communication method includes spectrally efficient pilot pattern for an OTFS based IoT and M2M system and facilitate communication with/between IoT devices implemented in high-speed vehicles/high-mobility environments.

BACKGROUND OF THE INVENTION

The Internet of Things (IoT) is an emerging and promising technology that employs a network of objects which interact with the physical environment. The IoT devices enabled in 5G standards known as new radio-based IoT (NR-IoT) focus on achieving low latency, high reliability, and adequate quality of service (QoS). The advancements in vehicular communication aim to provide improved road safety and infotainment services for minimizing fatal traffic incidences and reducing emergency response time with the help of inter or intra vehicular IoT/machine to machine (M2M) communication. Also, with the advancement of vehicular communication, automated and self-driving vehicles on the road will soon become prevalent with IoT devices for infotainment and road traffic safety services.

The IoT networks implemented in high-speed scenarios like intra and inter-vehicular communications in autonomous driving vehicles, high-speed vehicles, and trains will experience Doppler effect which cannot be handled by the currently existing NR-IoT framework which is based on orthogonal frequency division multiplexing (OFDM) modulation scheme. It is well known that the channel estimation in OFDM-based transmission suffers heavily under high Doppler conditions. This necessitates the advancement of IoT systems' transmission waveform.

Orthogonal time-frequency space (OTFS) modulation is a strong contender in the high mobility applications due to its inherent robustness to the doubly-selective channel.

The OTFS structure is designed to deal to with the high Doppler effect in the high mobility scenarios. In [1-3] studied the effect of high mobility with the different detectors and showed that OTFS modulation is a strong candidate for the high mobility scenarios.

The benefits of OTFS modulation in IoT/machine to machine (M2M) application are maximizd when the device with variable speed uses minimum resources to achieve the accurate channel state information (CSI). Imperfect knowledge of CSI and poor placement of pilot cause inefficient use of resources leading to reduction in capacity, and increase in bit error rate of the resourcconstrained systems like IoT/M2M devices operating with variable speeds. The system's spectral efficiency can be improved with the reduction of the guard pilot in the OTFS frame. The reduction of guard region introduces data and pilot interferences in the channel search region and received data symbols, respectively, of the OTFS frame. Hence, a strategical placement of the pilot in the transmitted OTFS frame of IoT/M2M system operating with variable speed is required to enhance the spectral efficiency along with the efficient channel estimation and low complex detection design. The pilot frame followed by the data frame helps to estimate the channel efficiently but does not achieve spectral efficiency with the high air time of the device. The embedded pilot-aided design of OTFS for are source-constrained system requires sufficiently large guard pilots to estimate the channel efficiently, which is spectrally inefficient. The superimposed pilots in the OTFS frame increase the complexity of channel estimation and data detection. It is thus a low-complex rake detector needs to be explored for the OTFS-based resource-constrained systems in association with efficient pilot design from the perspective of spectral efficiency.

REFERENCES

[1] Raviteja, Patchava, Khoa T. Phan, and Yi Hong. "Embedded pilot-aided channel estimation for OTFS in delay-Doppler channels." IEEE Transactions on Vehicular Technology 68.5 (2019): 4906-4917.
[2] Liu, Fei, et al. "Message Passing Based Structured Sparse Signal Recovery for Estimation of OTFS Channels with Fractional Doppler Shifts." IEEE Transactions on Wireless Communications (2021).
[3] Thaj, Tharaj, and Emanuele Viterbo. "Low complexity iterative rake decision feedback equalizer for zero-padded OTFS systems." IEEE Transactions on Vehicular Technology 69.12 (2020).

OBJECT OF THE INVENTION

It is thus the basic object of the present invention is to develop a communication system and method based on the OTFS modulations involving higher information symbol grid in a Delay-Doppler domain.

Another object of the present invention is to develop a transceiver system and a cooperative communication method which will includes spectrally efficient pilot pattern for an OTFS based IoT and M2M system and facilitate communication with/between IoT devices implemented in high-speed vehicles/high-mobility environments.

Another object of the present invention is to develop a transceiver system which will involve a low-complex rake detector design for the OTFS-based resource-constrained systems in association with efficient pilot design from the perspective of spectral efficiency.

SUMMARY OF THE INVENTION

Thus according to the basic aspect of the present invention there is provided a spectrally efficient low complex OFTS modulation based transceiver system for resource-constrained IoT device and M2M type communication in high-mobility environment comprising
at least one transmitter configured to transmit bit stream involving adaptive OTFS frame with selectively embedded pilot depending on mobility condition for improving spectral efficiency; and at least one receiver configured to dispose onto IoT devices with a low-complex iterative detector for receiving thus transmitted bit stream, said receiver updates the transmitter about its mobility condition through a control channel.

In a preferred embodiment of the present transceiver system, the IoT devices are configured to send request to register themselves in the control channel network at a given a time instant, when the IoT devices require to transmit or receive any information, including exchanging status of the IoT devices with base station and information about the mobility condition including current speed through Random-Access Channel, whereby a change in speed during the communication is shared through uplink control channel.

In a preferred embodiment of the present transceiver system, the IoT devices are configured to calculate channel state information based on the reception of a beacon signal including calculating the channel's root mean squared delay spread with the channel state information such as that while sharing information with the base station, the root mean squared delay spread of the channel and velocity information is being shared, where the root mean squared delay spread decides the number of delay indexes and the velocity decides the Doppler indexes for the system.

In a preferred embodiment of the present transceiver system, the transmitter includes
- a downlink sharing channel (DL-SCH) or an uplink sharing channel (UL-SCH);
- a physical downlink sharing channel (PDSCH) or a physical uplink sharing channel (PUSCH);
- a pilot, and
- means to design the adaptive OTFS frame based on the current vehicle speed information.

In a preferred embodiment of the present transceiver system, the transmitter further includes
- an inverse symplectic fast Fourier transform (ISFFT) for converting Delay-Doppler domain symbols in the OTFS frame into the time-frequency domain; and
- OFDM modulator to obtain the time domain signal.

In a preferred embodiment of the present transceiver system, the transmitter is implemented in FPGA board including basic blocks like counters, memory blocks, and arithmetic logic units.

In a preferred embodiment of the present transceiver system, the receiver includes
- a matching filter to detects the presence of the transmitted template in the unknown signal;
- OFDM demodulator to converts time domain signal to time-frequency domain, and
- SFFT to get back the Delay-Doppler domain representation of the transmitted information, wherein at the end of detection, the information symbols are rearranged into vector form and passed through modified PDSCH/PUSCH decoder and DL-SCH/UL-SCH decoder, whereby modified PDSCH/PUSCH decoder and DL-SCH/UL-SCH decoder has mirror steps of the modified PDSCH/PUSCH encoder and DL-SCH/UL-SCH encoder.

In a preferred embodiment of the present transceiver system, the receiver further includes a joint estimator and detector having
- a channel estimator involving a maximum likelihood (ML) channel path detection method that computes likelihood of channel path's presence at specified Delay-Doppler bins and detects path based on the most likely path including estimating complex channel gain for each detected path with a minimum mean squared error (MMSE) channel estimator, termed as $\hat{h}(\hat{\tau},\hat{v})$;
- a Pilot interference cancellation unit to remove interference from the received signal before passing it to an iterative rake detector utilizing the estimated channel, wherein the pilot inference in association with channel in Delay-Doppler domain can be written as $$I_{p,m_p+l} = \sum_{l' \in \mathcal{L}}^{P} \hat{G}_{m_p+l,l'} \cdot x_p$$

where $l \in L$ and $\hat{G}_{m_p+i,l'}$ is the linear time-variant estimated channel in the OTFS Delay-Doppler grid;

- said Rake Detector for iteratively canceling the inter-symbol interference and applying maximal ratio combining so as to maximize the signal to noise ratio (SNR) at the output;
- data interference cancellation unit to calculate data interference involving detected data symbols and removing from the channel search region G, where the data interference from I to the channel estimation region G, given by $$I_{d,m_p+l} = \sum_{l' \in \mathcal{L}, l' \neq l}^{P} \hat{G}_{m_p+l,l'} \cdot x_{m_p+l-l'}$$

and calculated data interference is subtracted from the received OTFS signal and the resultant signal is passed for further refining channel estimation; and
- a ML-MMSE channel estimator for refined channel estimation and update the pilot interference, wherein the updated pilot interference is removed from the received signal and the resultant signal is feedback to the detector to obtain the refined estimate of data symbols.

According to another aspect in the present invention there is provided a method for spectrally efficient low complex OTFS modulation based resource-constrained IoT device and M2M type communication in high-mobility environment comprising
- involving transmitter and updating the same with channel's maximum delay $d_{max}$ and maximum Doppler $D_{max}$;
- enabling the transmitter to transmit bit stream involving adaptive OTFS frame where information symbols are arranged in Doppler-first-delay-second arrangement with a typical OTFS grid size delay samples (M) and Doppler samples (N) to design a physical resource block (PRB) and thus forming an OTFS frame which is 2-dimensional of size M×N where the rows denote the delay index and columns denote the Doppler index and the delay rows $0 \leq m < M - d_{max} - 1$ have data symbols in the grid;
- setting lower $(M-d_{max})$ rows in the grid to zeros for a given $d_{max}$ thus forming arrangement of the information symbols in the Delay-Doppler which is zero-padded OTFS and facilitates to detect the symbols at the receiver with a low-complex iterative detector.

The above method comprises embedding pilot in the OTFS transmitted frame including reutilize zeros in the OTFS frame as null pilots, wherein a single pilot vector is placed in the $(M-d_{max}-1)^{th}$ row and the vector consists of pilot at $n=n_p^{th}$ column with zeros in the rest of the position.

In the above method, the embedded pilot placement in the Delay-Doppler domain is formulated as $$x_m(n) = \begin{cases} x_p\delta(n-n_p), & \Lambda \ m = m_p \\ 0, & \Lambda \ 0 < m - m_p \le d_{max} \\ data, & \Lambda \ otherwise \end{cases}$$

where $x_p$ is the pilot, $(m_p, n_p)$ is the pilot location in the 2-D delay-Doppler grid, and there are N number of columns (0<n<N);

wherein the pilot power is assigned as $d_{ZP}\sigma_d^2$, where $d_{ZP}$ is the total number of zeros in the OTFS frame after the pilot placement, and $\sigma_d^2$ is the power of data.

The above method includes placing of the null pilots around the pilot symbol adaptively involving dependency of the maximum Doppler index with velocity for reducing guard pilot in the OTFS frame to add $Nd_{max}$ additional data symbols in the OTFS frame and eliminating data interference in the channel search region.

In the above method, dependency of the maximum Doppler index with velocity includes $$D_{max} = \pm \left\lfloor \frac{f_c V_{max}}{C} \times \frac{N}{\Delta f} \right\rfloor$$

Where, $f_c$ is carrier frequency, $V_{max}$ is maximum velocity, C is the speed of light, N is the number of Doppler samples, and $\Delta f$ is the subcarrier frequency.

DETAILED DESCRIPTION OF THE INVENTION WITH REFERENCE TO THE ACCOMPANYING DRAWINGS

The invention is based partly on the insight that the OTFS modulations are only used for the higher information symbol grid in a Delay-Doppler domain. In contrast to the prior art, with the advancement of vehicular communication, IoT devices implemented in high-speed vehicles have less information to transmit over high-mobility environments. To incorporate the advantages of the OTFS in a high-mobility environment for an IoT device and M2M type communication, we have designed a transceiver with a spectrally efficient pilot pattern for an OTFS based IoT and M2M system.

Figure 1:
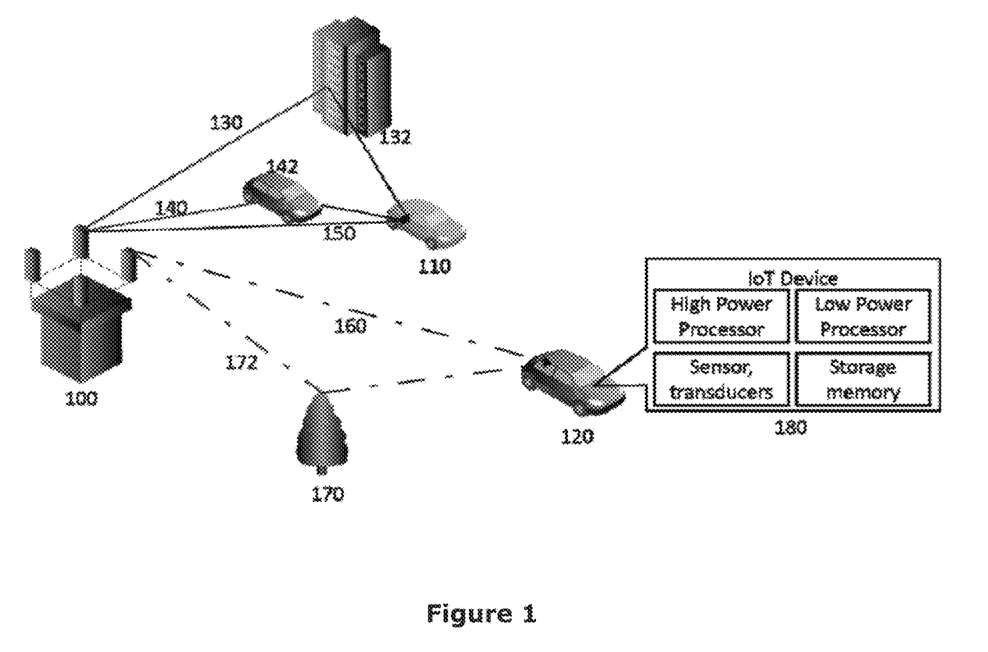
FIG. 1 shows a scenario of wireless IoT communication in highway.

FIG. 1 illustrates an example for wireless communication of IoT systems in a highway that may exhibit time/frequency selective fading. The system includes a transmitter 100 (e.g., a base station) and two IoT receivers 110 and 120, including multiple pathways of the transmitted signals. A first pathway 130 reflects through a building 132, the second pathway 140 reflects off of a car 142, and the third pathway 150 is in line-of-sight. Because each of the pathways 130, 140, and 150 travels a different distance and is attenuated or faded at a different level and different frequency when conventionally configured, the receiver 110 will suffer low throughput due to the destructive interference of the multipath signals. Similarly, IoT 120 receives the signal from multipath 160 and 172. The internal structure of the IoT receiver is presented in 180, which contains a high-power processor, a low-power processor, sensor transducers, and storage memory. As per the sleep schedule, the devices switch from low-power mode to high-power mode.

Figure 2:
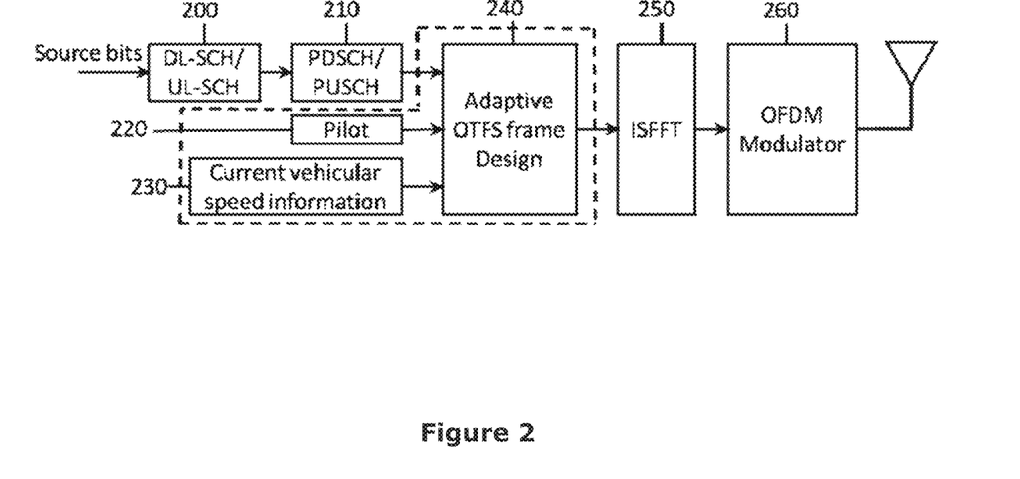
FIG. 2 shows a OTFS based NR-IoT transmitter.

Transmitter:

The block diagram in FIG. 2 shows the transmitter of the NR-IoT system with OTFS modulation, which is compatible with 5G and beyond. In the high power mode of operation, the device either transmits or receives the information. As shown in the block diagram, the bit stream is passed through downlink sharing channel (DL-SCH) or uplink sharing channel (UL-SCH) 200, followed by physical downlink sharing channel (PDSCH) or physical uplink sharing channel (PUSCH) 210. The PDSCH coded symbols, pilot 220, and the current vehicle speed information 230 are used to design the adaptive OTFS frame 240, which is the contribution of this disclosure.

Let the transmitter knows that the channel has a maximum delay $d_{max}$ and a maximum Doppler $D_{max}$. In the OTFS frame 240, the information symbols are arranged in Doppler first delay the second method with a typical OTFS grid size delay samples (M) and Doppler samples (N) to design a physical resource block (PRB). For example, a single PRB having 12 subcarriers with 14 OFDM symbols, the values of (M,N) will be (12, 14). An OTFS frame is 2-Dimensional of size M×N where the rows denote the delay index and columns denote the Doppler index. The delay rows $0 \le m < M - d_{max} - 1$ have data symbols in the grid. For the given $d_{max}$, we set lower (M-$d_{max}$) rows in the grid to zeros. The above arrangement of information symbols in the Delay-Doppler is called zero-padded OTFS, which helps to detect the symbols at the receiver with a low-complex iterative detector. To minimize the air time of each IoT or M2M device, we are going to use the embedded pilot design in the OTFS transmitted frame. As the embedded pilot design requires a lot of null pilots around the pilot symbol, we can reutilize the zeros in the above OTFS frame as the null pilots. So a single pilot vector is placed in the $(M-d_{max}-1)^{th}$ row. The vector consists of pilot at $n=n_p^{th}$ column with zeros in the rest of the position.

Embedded Pilot Design (all Kind of Speed):

The proposed embedded pilot block placement in the Delay-Doppler domain can be formulated as $$x_m(n) = \begin{cases} x_p\delta(n-n_p), & m = m_p \\ 0, & 0 < m - m_p \le d_{max} \\ data, & otherwise \end{cases}$$

Where $x_p$ is the pilot, $(m_p, n_p)$ is the pilot location in the 2-D delay-Doppler grid, and there are N number of columns (0<n<N). We assign the pilot power as $d_{ZP}\sigma_d^2$, where $d_{ZP}$ is the total number of zeros in the OTFS frame after the pilot placement, and $\sigma_d^2$ is the power of data. In general, to avoid interference between the data and pilot symbol vectors in the presence of delay spread, guard symbol vectors are placed on each side of the pilot symbol vector. This embedded-pilot configuration decreases spectral efficiency for lower OTFS grid structures, like the IoT and M2M system. However, with the reduction of guard pilot vectors (see FIG. 3), we can add $Nd_{max}$ additional data symbols in the OTFS frame compared to pilot design where guard vectors are present on both sides of the pilot vector. These additional data points in OTFS frames help us to improve the spectral efficiency of the IoT/M2M system.

By reducing the guard pilot in the OTFS frame, the channel estimation region is affected by the data interference. This data interference in the channel search region can be eliminated with an adaptive null pilot placement in the transmitted frame. As the channel is observed in the Delay-Doppler domain, the device's velocity decides the maximum Doppler shift index of the channel. The dependency of the maximum Doppler index with velocity allows us to place the null pilots around the pilot symbol adaptively. So the adaptivity of the IoT/M2M transmitted frame depends upon the prior estimation of the device's velocity.

Considering M=12, N=14, $d_{max}$=3, and $M_{bit}$=2 (QPSK), the spectral efficiency of the system when guard pilots are placed on both sides of the pilot vector is given as $$\eta_{SE_1} = \frac{MN - N(2d_{max} + 1)}{MN} \times M_{bit} = \frac{12 \times 14 - 14(2 \times 3 + 1)}{12 \times 14} \times 2 = 0.833 \ b/s/\text{Hz}.$$

Figure 3:
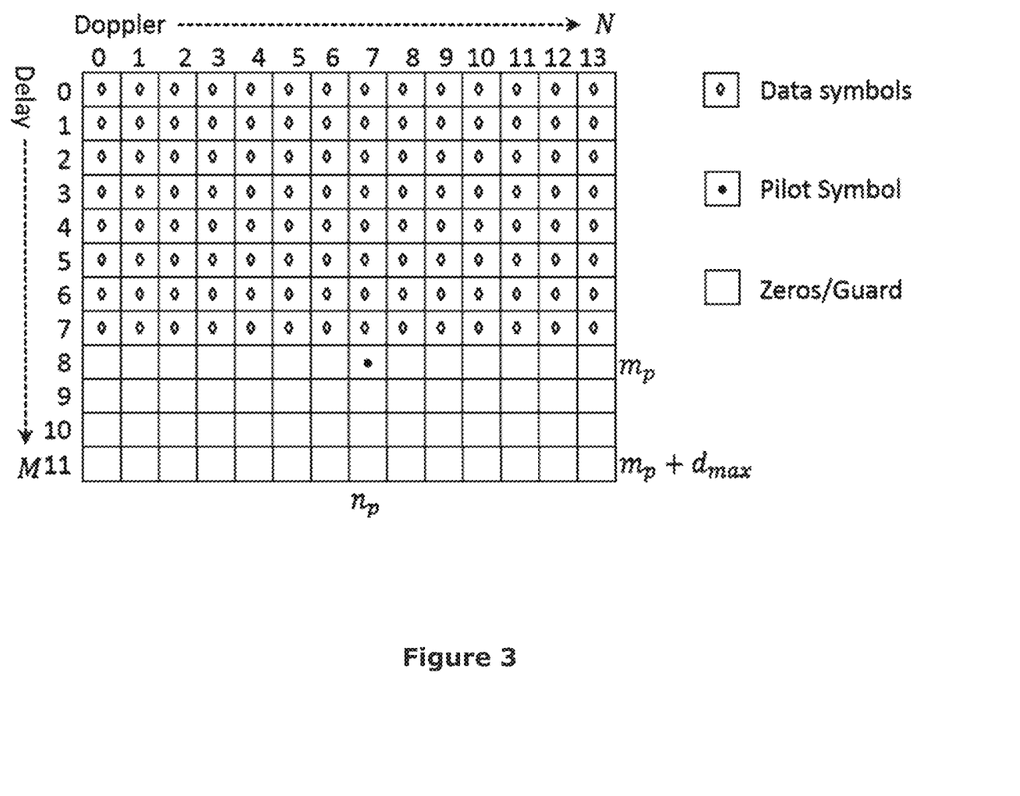
FIG. 3 shows a proposed embedded pilot with guard symbol vector on one side only (block 230).

Whereas in the proposed pilot design, where the guard pilots are placed on single side only as shown in FIG. 3, the spectral efficiency can be given as $$\eta_{SE_2} = \frac{MN - N(d_{max} + 1)}{MN} \times M_{bit} = \frac{12 \times 14 - 14(3 + 1)}{12 \times 14} \times 2 = 1.333 \ b/s/\text{Hz}$$

So, we have a 60% improvement in the spectral efficiency compared to the embedded pilot design where null vectors are placed on both sides of a pilot vector.

The proposed adaptive embedded pilot designs for different speeds are as follows:

Scenario 1: IoT device's speed 0 km/h–225 km/h

Figure 4:
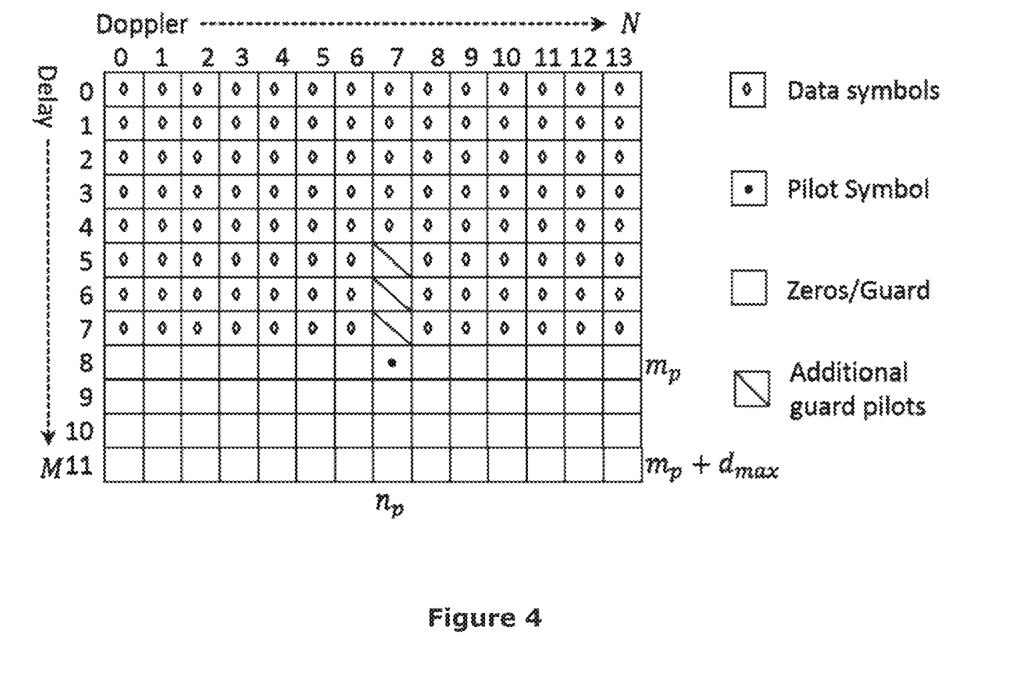
FIG. 4 shows proposed adaptive pilot design for case 1 (block 230).

If the vehicle having IoT/M2M is moving at a speed $(V_{max})$ of 120 km/h (444.4 Hz Doppler frequency) with a PRB of M×N=12×14, then the channel in the delay-Doppler domain will experience a Doppler spread at the $0^{th}$ index. Since, Doppler index $$D_v = \pm \left\lfloor \frac{f_c V_{max}}{C} \times \frac{N}{\Delta f} \right\rfloor = \lfloor 0.474 \rfloor = 0,$$

where C is the speed of light. As the channel only experiences the Doppler spread at the $0^{th}$ index, we can place the null pilots at a single column up to $d_{max}$ delay points above the pilot symbol, as shown in FIG. 4.

For example, with the above-mentioned parameters and $d_{max}$=3 with $M_{bit}$=2 (QPSK), the spectral efficiency of the adaptive pilot design for Scenario 1 is given as $$\eta_{SE} = \frac{MN - N(d_{max} + 1) + d_{max}(4D_v - 1)}{MN} \times M_{bit} =$$
$$\frac{12 \times 14 - 14(3 + 1) - 3(4 \times 0 + 1)}{12 \times 14} \times 2 = 1.297 \ b/s/\text{Hz}$$

So, we have a 55.7% improvement in the spectral efficiency compared to the embedded pilot design where null vectors are placed on both sides of the pilot vector.

Scenario 2: IoT Device's Speed Greater than 225 km/h

Figure 5:
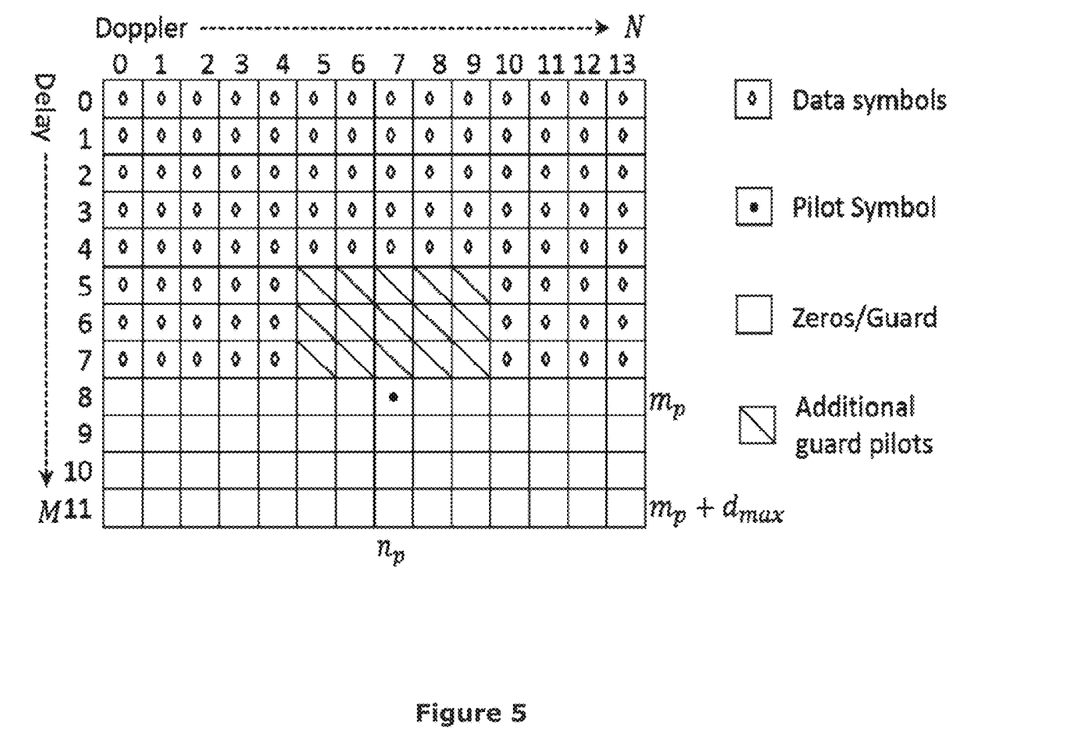
FIG. 5 shows proposed adaptive pilot design for case 2 (block 230).

If the vehicle having IoT/M2M is moving at a speed greater than 225 km/h with a PRB of M×N=12×14, then the channel in the Delay-Doppler domain will experience a Doppler spread at the $\{-1, 0, 1\}^{th}$ index. So, we can make 5 columns up to $d_{max}$ delay points above the pilot symbol as zero, as shown in FIG. 5. Let the vehicle is moving with a speed of 360 km/h (1333.34 Hz Doppler frequency), hence, with the considered PRB, it will experience a maximum Doppler at the $1^{th}$ index. Since, $$D_v = \pm \left\lfloor \frac{f_c V_{max}}{C} \times \frac{N}{\Delta f} \right\rfloor = \pm \lfloor 1.422 \rfloor = \pm 1.$$

As the channel only experiences the Doppler spread up to $1^{st}$ index, we will place the null pilots for $(4D_v+1)$=5 columns till $d_{max}$ delay points above the pilot symbol.

For example, with the above-mentioned parameters and $d_{max}$=3 with $M_{bit}$=2 (QPSK), the spectral efficiency of the adaptive pilot design for Scenario 2 is given as $$\eta_{SE} = \frac{MN - N(d_{max} + 1) + d_{max}(4D_v - 1)}{MN} \times M_{bit} =$$
$$\frac{12 \times 14 - 14(3 + 1) - 3(4 \times 1 + 1)}{12 \times 14} \times 2 = 1.154 \ b/s/\text{Hz}$$

So, we have a 38.53% improvement in the spectral efficiency compared to the embedded pilot design where null vectors are placed on both sides of the pilot vector. The above mathematical calculations show that the proposed pilot design in the Delay-Doppler domain can improve the spectral efficiency of the IoT/M2M system.

Figure 6:
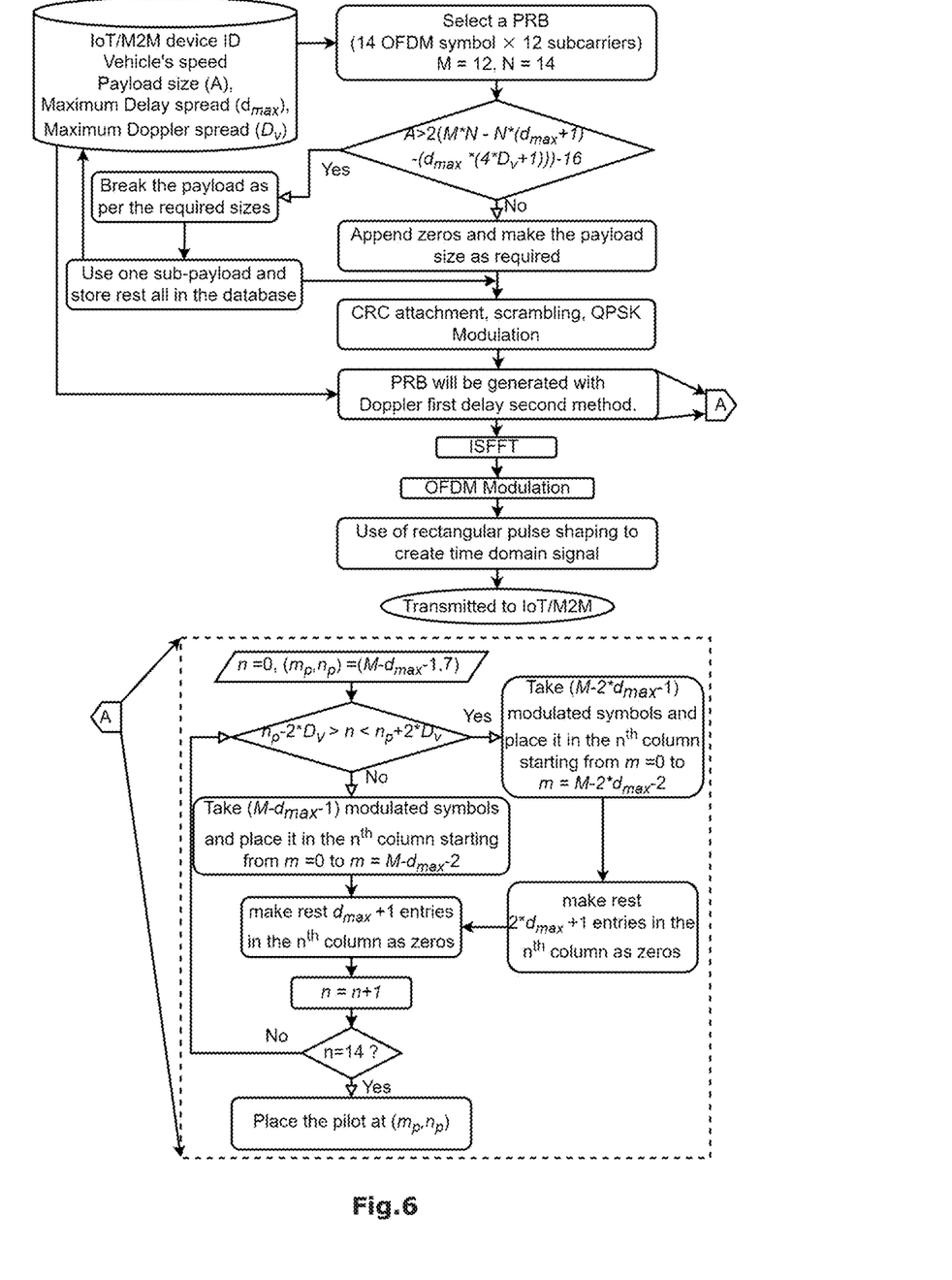
FIG. 6 shows flow chart of OTFS based NR-IoT/M2M transmitter design.

The Delay-Doppler domain symbols in the OTFS frame are converted to the time domain using the inverse symplectic fast Fourier transform (ISFFT) operation 250 and OFDM modulator 260. At the end, the time domain signal is transmitted to the IoT device 120. The above described OTFS-based NR-IoT transmitter design is shown as flow chart in FIG. 6.

Figure 7:
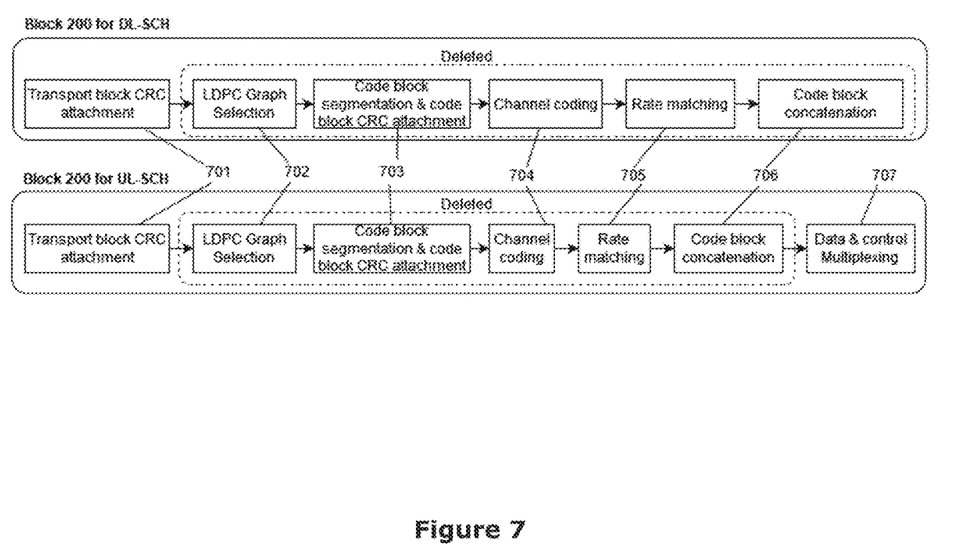
FIG. 7 shows intermediate blocks of DL-SCH/UL-SCH.

The use of OTFS modulation for the IoT system helps to simplify the transmitter design by discarding the LDPC encoder. The corresponding receiver design is also free from the complex LDPC decoder. Hence, the devices conserve the energy required for the LDPC encoder and decoder. FIG. 7 shows the blocks deleted at DL-SCH and UL-SCH due to the removal of LDPC encoder.

Receiver:

The received time-domain signal pass through matching filter 800, OFDM demodulator 810, and SFFT 820 to get back the Delay-Doppler domain representation of the transmitted information. We have developed a joint estimator and detector which is another contribution to this disclosure. At the end of detection 830, the information symbols are rearranged into vector form and passed through the modified PDSCH/PUSCH decoder 840 and DL-SCH/UL-SCH decoder 850. The proposed receiver scheme for OTFS based NR-IoT system is given in FIG. 8.

In a preferred embodiment, the IoT devices are configured to send request to register themselves in the control channel network at a given a time instant, when the IoT devices require to transmit or receive any information, including exchanging status of the IoT devices with base station and information about the mobility condition including current speed through Random-Access Channel, whereby a change in speed during the communication is shared through uplink control channel. The IoT devices are configured to calculate channel state information based on the reception of a beacon signal including calculating the channel's root mean squared delay spread with the channel state information such as that while sharing information with the base station, the root mean squared delay spread of the channel and velocity information is being shared, where the root mean squared delay spread decides the number of delay indexes and the velocity decides the Doppler indexes for the system.

Figure 8:
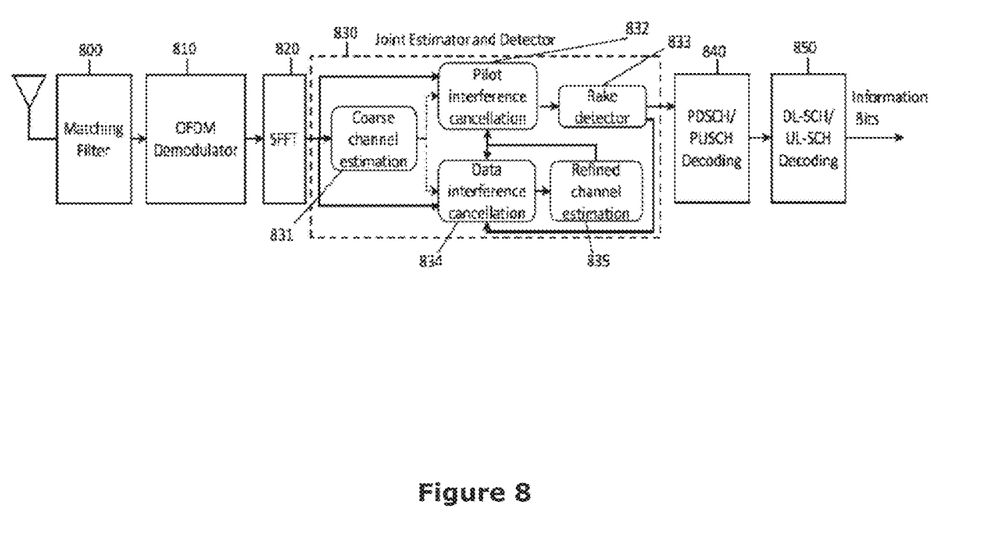
FIG. 8 shows proposed receiver scheme for OTFS based NR-IoT system

Let $Y_{dp}$ be the received two-dimensional symbols in the Delay-Doppler grid. Let $y_m$ be column vectors containing the symbols in the $m^{th}$ row of $Y_{dp}$: $y_m = [Y_{dp}(m, 0), Y_{dp}(m, 1), \ldots, Y_{dp}(m, N-1)]^T$, where m and n denotes the delay and Doppler indices, respectively, in the two-dimensional grid. The input-output relation for the rectangular pulse shaping waveform in Delay-Doppler domain can be written as $$Y_{dp}(m, n) = \sum_{i=1}^{P} h_i \xi_i(m, n) X_{dp}([m - l_i]_M, [n - k_i]_N) + W(m, n) \quad (1)$$

where P is the number of propagation paths; $h_i$, $l_i$, and $k_i$ are the complex path gain, delay and Doppler shift index, respectively associated with the $i^{th}$ path. W(m, n) is independent and identically distributed (i.i.d) additive white Gaussian noise (AWGN) with variance $\sigma_w^2$ and $$\xi_i(m, n) = \begin{cases} e^{-j2\pi \frac{n}{N}} q^{k_i([m-l_i]_M)}, & m < l_i \\ q^{k_i([m-l_i]_M)}, & m \geq l_i \\ 0 & \text{otherwise} \end{cases}$$

and where $$q = e^{j\frac{2\pi}{MN}}.$$

By setting $X_{dp}([m-l_i]_M, [n-k_i]_N) = x_{[m-l_i]_M}([n-k_i]_N)$ as zero, if $m \geq M - d_{max}$ and $n = 0, 1, \ldots, N-1$, we can ignore the first case in $\xi_i(m, n)$, which has a dependency on n (Doppler index). Here, $d_{max}$ is the maximum delay that the channel can experience. Finally, the vector $y_m$ in matrix multiplication form can be expressed as $$y_m = \sum_{l \in \mathcal{L}}^{P} \mathcal{G}_{m,l} \cdot x_{m-l} + w_m \quad (2)$$

where, $\mathcal{L}$ is the set of normalized delay shifts, $$\mathcal{G}_{m,l} = \begin{bmatrix} \mu_{m,l}(0) & \mu_{m,l}(N-1) & \cdots & \mu_{m,l}(1) \\ \mu_{m,l}(1) & \mu_{m,l}(0) & \cdots & \mu_{m,l}(2) \\ \vdots & \vdots & \vdots & \vdots \\ \mu_{m,l}(N-1) & \mu_{m,l}(N-2) & \cdots & \mu_{m,l}(0) \end{bmatrix},$$

and $$\mu_{m,l}(k) = \begin{cases} \mu_l(k)\theta_{m-l}(k), & \text{if } l \in \mathcal{L}, m \geq l \\ 0, & \text{otherwise} \end{cases}$$

Here $\mu_l(k) = h_i$ if $l = l_i$ and $k = [k_i]_N$, $\mu_l(k) = 0$ for all other case and $$\theta_m(k) = \begin{cases} q^{km}, & \text{if } 0 \leq k \leq \frac{N}{2} - 1 \\ q^{-(N-k)m}, & \text{if } \frac{N}{2} \leq k \leq N - 1 \end{cases}.$$

By making $x_m(n) = 0$, for $m \geq M - d_{max}$ and $n = 0, 1, \ldots, N-1$, the receive signal vectors become independent of Doppler shift index. This leads to utilize multiple correlators to detect the most substantial P multipath components separately. Demodulation and bit decisions are then based on the weighted outputs of the P correlators, which provide better detection of the transmitted signal compared to single component. The above concept is called a rake detector. The designed rake detector will work efficiently when $x_m = 0_N$, if $m \geq M - d_{max}$. But to reutilize the zero-padded area, we embedded a pilot at $m_p = M - d_{max} - 1$ and $n_p = \lceil N/2 \rceil$. Due to the multipath channel, the data and the pilot symbol are spread in the zero-padded region of the received OTFS frame. So while detecting the data symbols using a rake detector, the pilot spread will act as interference.

Joint Estimator and Detector:

In the received OTFS frame, the pilot will spread over a region $G \triangleq \{(m, n): 0 \leq m - m_p \leq d_{max} \text{ and } |n - n_p| \leq k_v\}$. This region is also called as channel search region. If the pilot design shown in FIG. 3 is used, the channel search region G will have the data interference from $\mathfrak{I} \triangleq \{(m, n): 0 < m_p - m \leq d_{max} \text{ and } |n - n_p| \leq 2k_v\}$. To mitigate the data interferences during the channel estimation and pilot interference during the data detection, we have proposed a joint estimator and detector 830 whose intermediate blocks are discussed as below.

Channel Estimator:

As we have reduced the guard pilot in the embedded pilot design to increase the spectral efficiency, the received pilot symbol suffers from data interference. In the presence of interference, it's more likely to have a higher rate of channel path misdetections. The channel is estimated with path detection followed by complex gain estimation. At 831, we used a maximum likelihood (ML) channel path detection method that computes the likelihood of channel path's presence at specified Delay-Doppler bins and path detection is based on the most likely path. We further estimated the complex channel gain for each detected path with a minimum mean squared error (MMSE) channel estimator, termed as $\hat{h}(\hat{i}, \hat{v})$.

Pilot Interference Cancellation

The benefits of zero-padded in the OTFS frame aids in employing the iterative rake detector. However, with the pilot vector in the zero-padded region, the received signal will not be free from the Doppler index dependency as described earlier. So in 832, the pilot interference is required to be removed from the received signal before passing it to an iterative rake detector. Utilizing the estimated channel, the pilot inference in association with channel in Delay-Doppler domain can be written as $$I_{p,m_p+l} = \sum_{l' \in \mathcal{L}}^{P} \tilde{\mathcal{G}}_{m_p+l,l'} \cdot x_p \quad (3)$$

where $l \in \mathcal{L}$ and $\tilde{\mathcal{G}}_{m_p+l,l'}$ is the linear time-variant estimated channel in the OTFS Delay-Doppler grid.

Rake Detector:

In the rake detector 833, the inter-symbol interference is iteratively cancelled and maximal ratio combining is applied so as to maximize the signal to noise ratio (SNR) at the output. Due to the inter-symbol interference caused by delay spread, all vectors $x_m$ have a signal component in $\mathcal{L}$ received symbol vectors $y_{m+l}$ where $l \in \mathcal{L}$. Let $e_m^l$ be the channel impaired signal component of $x_m$ in the received vector $y_{m+l}$ at delay index m+l after removing the interference of the other transmitted symbol vectors of $x_{k \neq m}$. Assuming we have the estimates of symbol vectors from previous iterations, we can then write $e_m^l$ as $$e_m^l = y_{m+l} - \sum_{l' \in \mathcal{L}, l' \neq l} \mathcal{G}_{m+l,l'} \hat{x}_{m+l-l'} \quad (4)$$

Let us define $$T_m = \sum_{l \in \mathcal{L}} \mathcal{G}_{m+l,l'}^H \mathcal{G}_{m+l,l'}$$

$$f_m = \sum_{l \in \mathcal{L}} \mathcal{G}_{m+l,l'}^H e_m^l$$

Then the output of the MRC is given by $$a_m = T_m^{-1} f_m \quad (5)$$

The estimate of $x_m$ is obtained symbol-by-symbol by using the ML criterion as given below $$\hat{x}_m(n) = \arg\min_{a_j \in Q} |q_j - a_m(n)|, \quad (6)$$

where $q_j$ is an element from the set of transmitted QAM alphabet Q with $j=1 \ldots |Q|$ and $n=0, \ldots, N-1$. This is repeated iteratively until the maximum numbers of iterations are reached.

Data Interference Cancellation

The detected data symbols are utilized to calculate the data interference and is removed from the channel search region G in 834. The data interference from $\mathfrak{I}$ to the channel estimation region G, given by $$I_{d,m_p+l} = \sum_{l' \in \mathcal{L}, l' \neq l}^{P} \tilde{\mathcal{G}}_{m_p+l,l'} \cdot x_{m_p+l-l'} \quad (7)$$

The calculated data interference is subtracted from the received OTFS signal and the resultant signal is passed for further refining channel estimation.

The ML-MMSE channel estimator is utilized for refined channel estimation block 835. The refined channel estimate is used to update the pilot interference. The updated pilot interference is removed from the received signal and the resultant signal is feedback to the detector to obtain the refined estimate of data symbols. So, block 832-835 is repeated iteratively until there is no improvement in the detected data at the current iteration and immediate previous iteration.

Due to the adaptive pilot design shown in FIG. 4 and FIG. 5, the Delay-Doppler domain received signal is free from the data interference at the channel search region. Thus, the data interference cancellation block can be bypassed at the receiver, which further simplifies the receiver design.

Figure 9:
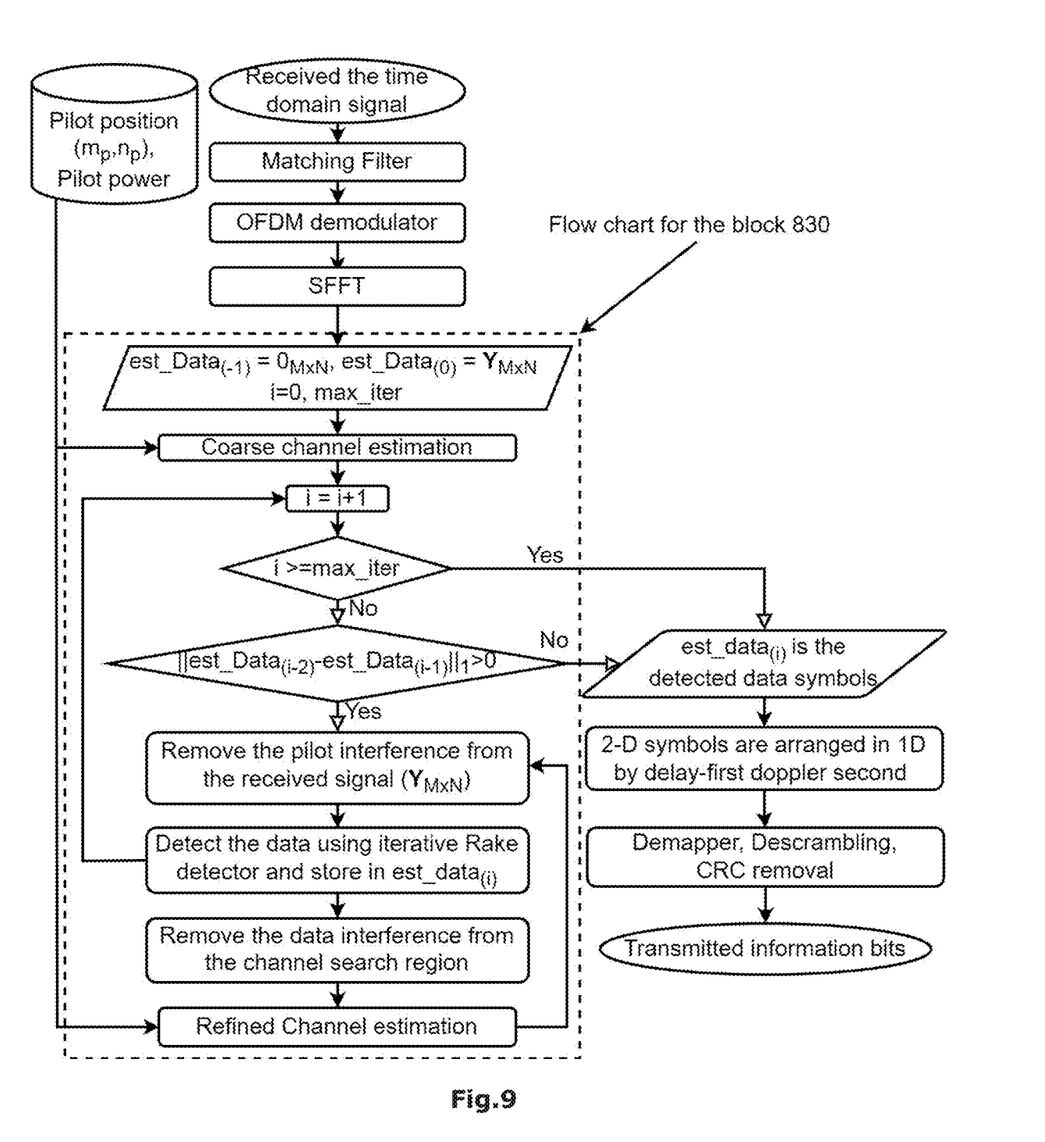
FIG. 9 shows flow chart of proposed receiver scheme for OTFS based NR-IoT systems

Finally, the information symbols are rearranged in vector format by Doppler first delay the second method. These information symbols are then passed through the de-mapper (e.g., BPSK, QPSK, M-QAM demodulator) followed by a descrambler. At last, with the obtained CRC output, it decides for the request for retransmission. FIG. 9 shows the flow chart of the proposed receiver design of the OTFS based NR-IoT system. At the end of the process, the required information is received at the IoT end.

Results:

Each IoT device occupies one resource block with subcarrier spacing (SCS) of 15 kHz and uses 4 GHz as carrier frequency. Each resource block has 12 subcarriers with 14 OFDM symbols so the values of (M,N) will be (12,14). The OTFS frame dimension becomes M=12, N=14. The channel spread parameters are set as $d_{max}=3$ and $D_{max}=(0,1,2)$, with exponentially decaying channel response in the delay dimension. Each delay tap has a single Doppler shift generated using Jake's formula $v_i = V_{max} \cos(\theta_i)$, where $V_{max}$ is the maximum Doppler shift determined by the IoT device's speed and $\theta_i$ is uniformly distributed over $[-\pi, \pi]$.

Figure 10:
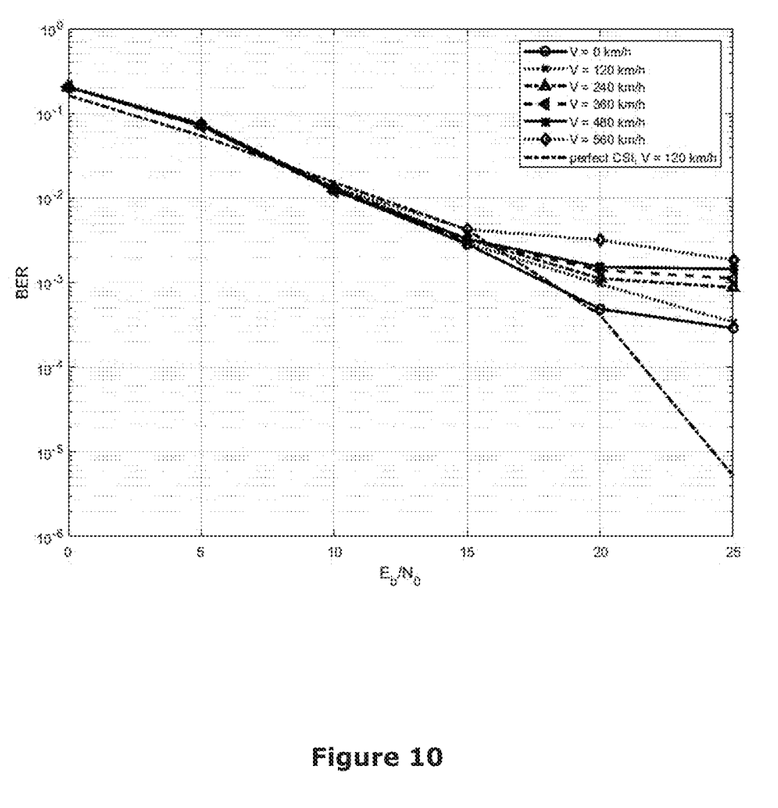
FIG. 10 shows BER performance of OTFS based NR-IoT system with different vehicle speed.

The bit error performance of the OTFS-based NR-IoT system at different vehicular speeds with the proposed receiver scheme is shown in FIG. 10. The speed varies from static to high speed (560 km/h). From the figure, it is observable that as the speed of the IoT device increases, the bit error rate performance degrades. This is attributed to the Doppler effect of the channel that increases with the increase in the vehicle speed. However, the system's spectral efficiency improves with the adaptive pilot design.

The advantages of the present invention can be summarized as hereunder:

i. The heavily low complex transceiver design is energy-efficient and cost-effective for IoT/M2M deployment.

ii. The proposed transceiver design is applicable to establish a link in resource-constrained devices with variable speeds.

iii. The intra and inter-vehicular communication for infotainment services and transport road traffic information can be enhanced using the proposed transceiver.

iv. The designed system supports any static IoT device trying to communicate with a 5G network and beyond.

v. The embedded pilot design minimizes the air time of the devices.

vi. The adaptive embedded pilot-aided design enhances the spectral efficiency with less complexity.

vii. The proposed joint channel estimation and the low complex detector use the inherent property of the zero-padded OTFS with the reutilization of zeros.

viii. The efficient transceiver design obviates the need for complex encoders like the LDPC.

The invention claimed is:

1. A spectrally efficient low complex Orthogonal Time Frequency Space (OTFS) modulation based transceiver system for resource-constrained IoT device and M2M type communication in high-mobility environment comprising:
at least one transmitter configured to transmit bit stream using adaptive Orthogonal Time Frequency Space (OTFS) frame with selectively embedded pilot depending on mobility condition for improving spectral efficiency; and
at least one receiver configured to dispose onto IoT devices for receiving the transmitted bit stream, said receiver updates the transmitter about mobility condition of said at least one receiver through a control channel;
wherein said adaptive OTFS frame includes information symbols arranged in Doppler-first-delay-second arrangement in a 2-dimensional grid size of M delay samples and N Doppler samples, where rows denote the delay index and columns denote the Doppler index and the delay rows ($0 \leq m < M - d_{max} - 1$) have data symbols in the grid, where lower rows ($M - d_{max}$) in the grid set are set to zeros for a given maximum delay $d_{max}$ of the channel and the grid forms an arrangement of the information symbols in the Delay-Doppler which is zero-padded OTFS and facilitates to detect the symbols at the receiver by a joint channel estimator and a low-complex iterative detector.

2. The transceiver system as claimed in claim 1, wherein the IoT devices are configured to send request to register in the control channel at a given a time instant, when the IoT devices require to transmit or receive any information, including exchanging status of the IoT devices with base station and information about the mobility condition including current speed through Random-Access Channel, whereby a change in speed during the communication is shared through the control channel.

3. The transceiver system as claimed in claim 1, wherein the IoT devices are configured to calculate channel state information based on the reception of a beacon signal including calculating a channel's root mean squared delay spread with the channel state information such as that while sharing information with the base station, the root mean squared delay spread of the channel and velocity information is being shared, wherein the root mean squared delay spread decides a number of the delay indexes and a velocity decides a number of the Doppler indexes for the system.

4. The transceiver system as claimed in claim 1, wherein the transmitter includes:
a downlink sharing channel (DL-SCH) or an uplink sharing channel (UL-SCH);
a physical downlink sharing channel (PDSCH) or a physical uplink sharing channel (PUSCH);
a pilot, and
means to design the adaptive OTFS frame based on a current vehicle speed information.

5. The transceiver system as claimed in claim 4, wherein the transmitter further includes:
an inverse symplectic fast Fourier transform (ISFFT) for converting Delay-Doppler domain symbols in the OTFS frame into a time-frequency domain; and
OFDM modulator to obtain a time domain signal.

6. The transceiver system as claimed in claim 5, wherein the transmitter is implemented in FPGA board including basic blocks having counters, memory blocks, arithmetic logic units.

7. The transceiver system as claimed in claim 1, wherein the receiver includes:
a matching filter to detects a presence of a transmitted template in a unknown signal;
OFDM demodulator to converts time domain signal to time-frequency domain, and Symplectic Fast Fourier Transformer (SFFT) to get back the Delay-Doppler domain representation of the transmitted information, wherein at the end of detection, the information symbols are rearranged into vector form and passed through modified PDSCH/PUSCH decoder and DL-SCH/UL-SCH decoder, whereby modified PDSCH/PUSCH decoder and DL-SCH/UL-SCH decoder has mirror steps of the modified PDSCH/PUSCH encoder and DL-SCH/UL-SCH encoder.

8. The transceiver system as claimed in claim 1, wherein the joint estimator and iterative detector in the receiver includes:
a channel estimator involving a maximum likelihood (ML) channel path detection method that computes likelihood of channel path's presence at specified Delay-Doppler bins and detects path based on a most likely path including estimating complex channel gain for each detected path with a minimum mean squared error (MMSE) channel estimator, termed as $\hat{h}(\hat{i},\hat{v})$;
a Pilot interference cancellation unit to remove interference from the received signal before passing it to an iterative rake detector utilizing the estimated channel, wherein the pilot inference in association with channel in Delay-Doppler domain can be written as $$I_{p,m_p+l} = \sum_{i \in \mathcal{L}}^{P} G^A_{m_{p+1,i}} \cdot x_p$$

where $l \in L$ and $G_{m_{p+1,i}}^A$ is the linear time-variant estimated channel in the OTFS Delay-Doppler grid;
said iterative rake detector for iteratively canceling an inter-symbol interference and applying maximal ratio combining so as to maximize a signal to noise ratio (SNR) at the output;
data interference cancellation unit to calculate data interference involving detected data symbols and removing from the channel search region G, where the data interference from I to the channel estimation region G, given by $$I_{p,m_p+l} = \sum_{i \in \mathcal{L}, i \neq l}^{P} G^A_{m_{p+1,i}} \cdot x_{m_p+l-i}$$

and calculated data interference is subtracted from the received OTFS signal and the resultant signal is passed for further refining channel estimation; and
a ML-MMSE channel estimator for refined channel estimation and update the pilot interference, wherein the updated pilot interference is removed from the received signal and the resultant signal is feedback to the detector to obtain the refined estimate of data symbols.

9. A method for spectrally efficient low complex OFTS modulation based resource-constrained IoT device and M2M type communication in high-mobility environment involving the system as claimed in claim 1 comprising involving transmitter and updating the transmitter with channel's maximum delay $d_{max}$ and maximum Doppler $D_{max}$;

enabling the transmitter to transmit bit stream involving said adaptive OTFS frame;

setting the lower rows (M−$d_{max}$) in the grid to zeros for a given $d_{max}$ thus forming arrangement of the information symbols in the Delay-Doppler which is zero-padded OTFS and facilitates to detect the symbols at the receiver.

10. The method as claimed in claim 9, comprising embedding pilot in the OTFS transmitted frame including reutilize zeros in the OTFS frame as null pilots, wherein a single pilot vector is placed in the (M−$d_{max}$−1)th row and the vector consists of pilot at n=$n_p^{th}$ column with zeros in the rest of the position.

11. The method as claimed in claim 9, wherein the embedded pilot placement in the Delay-Doppler domain is formulated as $$x_m(n) = \begin{cases} x_p \delta(n - n_p), & \Lambda \quad m = m_p \\ 0, & \Lambda \quad 0 < m - m_p \leq d_{max} \\ data, & \Lambda \quad otherwise \end{cases}$$

where $x_p$ is the pilot, ($m_p$,$n_p$) is the pilot location in the 2-D delay-Doppler grid, and there are N number of columns (0<n<N);

wherein the pilot power is assigned as $d_{ZP}\sigma_d^2$, where $d_{ZP}$ is the total number of zeros in the OTFS frame after the pilot placement, and $\sigma_d^2$ is the power of data.

12. The method as claimed in claim 9, includes placing of the null pilots around the pilot symbol adaptively involving dependency of the maximum Doppler index with velocity for reducing guard pilot in the OTFS frame to add $Nd_{max}$ additional data symbols in the OTFS frame and eliminating data interference in the channel search region.

13. The method as claimed in claim 12, wherein dependency of the maximum Doppler index with velocity includes $$D_{max} - \perp \left\lfloor \frac{f_c V_{max}}{C} \times \frac{N}{\Delta f} \right\rfloor$$

Where, $f_c$ is carrier frequency, $V_{max}$ is maximum velocity, C is the speed of light, N is the number of Doppler samples, and $\Delta f$ is the subcarrier frequency.

* * * * *